United States Patent
Lê et al.

(10) Patent No.: US 9,599,512 B2
(45) Date of Patent: Mar. 21, 2017

(54) POLYAMIDE, COMPOSITION COMPRISING SUCH A POLYAMIDE, AND USES THEREOF

(75) Inventors: Guillaume Lê, Colombelles (FR); Julien Jouanneau, Pont-Audemer (FR); Benjamin Saillard, Bernay (FR)

(73) Assignee: ARKEMA FRANCE, Colombes (FR)

( * ) Notice: Subject to any disclaimer, the term of this patent is extended or adjusted under 35 U.S.C. 154(b) by 0 days.

(21) Appl. No.: 12/999,686

(22) PCT Filed: Jun. 19, 2009

(86) PCT No.: PCT/FR2009/051176
§ 371 (c)(1),
(2), (4) Date: Jan. 14, 2011

(87) PCT Pub. No.: WO2009/153531
PCT Pub. Date: Dec. 23, 2009

(65) Prior Publication Data
US 2011/0111154 A1    May 12, 2011

(30) Foreign Application Priority Data
Jun. 20, 2008 (FR) .................... 08 54100

(51) Int. Cl.
C08K 5/04 (2006.01)
G01J 3/433 (2006.01)
G01J 3/02 (2006.01)

(52) U.S. Cl.
CPC .............. *G01J 3/4338* (2013.01); *G01J 3/02* (2013.01); *G01J 3/0297* (2013.01); *Y10T 428/139* (2015.01); *Y10T 428/1352* (2015.01); *Y10T 428/1397* (2015.01)

(58) Field of Classification Search
USPC .... 528/310; 524/275, 432; 428/474.4, 474.7
See application file for complete search history.

(56) References Cited

U.S. PATENT DOCUMENTS

| | | | |
|---|---|---|---|
| 5,434,307 A | 7/1995 | Nwaonicha et al. | |
| 6,004,784 A | 12/1999 | Mobley et al. | |
| 7,133,209 B2 * | 11/2006 | Wursche et al. | 359/642 |
| 2002/0028499 A1 * | 3/2002 | Anderson et al. | 435/253.6 |
| 2003/0235666 A1 | 12/2003 | Buhler | |
| 2005/0272908 A1 * | 12/2005 | Linemann et al. | 528/310 |
| 2007/0270544 A1 | 11/2007 | Buhler et al. | |
| 2011/0040023 A1 | 2/2011 | Buhler et al. | |
| 2011/0171408 A1 | 7/2011 | Saillard et al. | |

FOREIGN PATENT DOCUMENTS

| | | |
|---|---|---|
| EP | 0725101 A1 | 8/1996 |
| EP | 1595907 A1 | 11/2005 |
| WO | 9106660 A1 | 5/1991 |
| WO | WO2008142139 | * 11/2008 |

OTHER PUBLICATIONS

World IP Organization. "International Search Report." PCT/FR2009/051176, Applicant: Arkema France, Mailed: Nov. 5, 2009.
Kim, Ki-Soo and Arthur J. Yu. "Copolyamides Derived from Brassylic Acid." (Journal of Applied Polymer Science), Jan. 1, 1979, pp. 439-444, vol. 23.
Espacenet Database. "English abstract—Transparent colourless amorphous polyamides and moulded articles." EP 0725101 A1. Applicant: EMS-INVENTA AA, Aug. 7, 1996.

* cited by examiner

*Primary Examiner* — Ellen S Wood
(74) *Attorney, Agent, or Firm* — Millen, White, Zelano and Branigan, P.C.

(57) ABSTRACT

The invention relates to a polyamide comprising at least one repeat unit corresponding to the general formulation: X·Y in which: X represents a cycloaliphatic diamine and Y represents an aliphatic dicarboxylic acid chosen from dodecanedioic ($C_{12}$) acid, tetradecanedioic ($C_{14}$) acid and hexadecanedioic ($C_{16}$) acid, characterized in that said dicarboxylic acid comprises organic carbon of renewable origin, determined according to Standard ASTM D6866. The invention also relates to a composition comprising this polyamide and also to the use of this polyamide and of such a composition.

10 Claims, No Drawings

POLYAMIDE, COMPOSITION COMPRISING SUCH A POLYAMIDE, AND USES THEREOF

The present invention relates to a polyamide, to its process of preparation and to its uses, in particular in the manufacture of various items, such as staples, for example contact lenses, spectacle lenses, electrical, electronic or motor vehicle fittings, surgical materials, packaging or sports equipment.

The invention also relates to a composition comprising such a polyamide and to the uses of this composition, in particular in the manufacture of all or part of the items which have just been listed above.

Transparent amorphous polyamides obtained by polycondensation of diamines and of diacids are currently known. Such polyamides are particularly advantageous as they exhibit numerous mechanical properties, such as impact strength, tensile strength and/or compressive strength, high resistance to external attack (such as heat, chemicals, UV radiation, and the like), and also transparency.

Consequently, the appearance has been seen of items based on polyamides, such as, for example, spectacle frames, various cases, motor vehicle fittings, surgical materials, packaging or sports equipment.

Transparent amorphous polyamides suitable for the manufacture of items of this type have been described in particular in the documents EP 1 595 907 and US 2005/0272908 on behalf of the Applicant. These polyamides are obtained by polycondensation of at least one cycloaliphatic diamine and at least 50 mol % of tetradecanedioic acid, it being possible for the other additional dicarboxylic acid or acids to be chosen from aliphatic, aromatic and cycloaliphatic dicarboxylic acids.

These polyamides exhibit not only all the properties set out above but also a relatively high glass transition temperature Tg typically of the order of 130° C. to 160° C. approximately.

However, the environmental concerns of recent years militate in favour of the development of materials which meet as much as possible the concerns for sustainable development by limiting in particular the provisioning of starting materials resulting from the oil industry in their manufacture.

The aim of the present invention is thus to provide a polyamide having at least some of the mechanical properties set out above while comprising, in its structure, units resulting from a renewable starting material.

Other characteristics, aspects, objects and advantages of the present invention will become even more clearly apparent on reading the description and examples which follow.

Generally, polyamides comprise at least two identical or distinct repeat units, these units being formed from the two corresponding monomers or comonomers. Polyamides are thus prepared from two or more monomers or comonomers chosen from an amino acid, a lactam and/or a dicarboxylic acid and a diamine.

The aim of the present invention is achieved via a polyamide comprising at least one repeat unit corresponding to the following general formulation:

X·Y in which
X represents a cycloaliphatic diamine and
Y represents an aliphatic dicarboxylic acid chosen from dodecanedioic ($C_{12}$) acid, tetradecanedioic ($C_{14}$) acid or hexadecanedioic ($C_{16}$) acid, characterized in that the said aliphatic dicarboxylic acid comprises organic carbon of renewable origin, also known as bioresourced, determined according to Standard ASTM D6866.

Thus, the polyamide according to the invention can be a homopolyamide, when it comprises only identical X·Y units. The polyamide according to the invention can also be a copolyamide when it comprises at least two distinct X·Y units. Generally, the copolyamides are denoted X·Y/Z, making it possible to distinguish the various comonomers. Preferably, the polyamide according to the invention is a homopolyamide.

A renewable starting material is an animal or vegetable natural resource, the stock of which can be built up again over a short period on the human scale. In particular, it is necessary for this stock to be able to be renewed as quickly as it is consumed.

Generally, the durability of polyamides is one of the essential qualities of these polymers. Polyamides are generally used in applications for which the expected lifetimes are at least of the order of a decade. When starting materials of renewable origin, such as vegetable oil, such as castor oil or palm oil, for example, are used in the manufacture of these polyamides, it is possible to consider that a certain amount of $CO_2$ initially withdrawn from the atmosphere during photosynthesis, in the case of plants, is fixed in the material on a long-term basis, thus taking it away from the carbon cycle during at least the entire lifetime of the polyamide product.

In contrast, polyamides of fossil origin do not capture atmospheric $CO_2$ during their lifetime (for example captured during photosynthesis). They potentially release, at the end of life (for example during incineration), an amount of fossil $CO_2$ of the order of 2.5 tonnes per tonne of polyamide which had been captured previously in the fossil resource.

When fossil starting materials are used to manufacture these polyamides, a contribution is thus made, at the end of the life of the material, to reinjecting, into the carbon cycle, carbon which was removed therefrom and since fossilized over a timescale of the order of several million years. In other words, this carbon will be an addition to the cycle, resulting in an imbalance. These phenomena then contribute to the effect of accumulation and thus to the increase in the greenhouse effect.

For the polyamides of the invention, the use of starting materials of renewable origin instead of starting materials of fossil origin contributes to reducing by at least 44% the amounts of fossil $CO_2$ potentially emitted at the end of life, $CO_2$ originating from their carbon-based structure.

Unlike the materials resulting from fossil materials, renewable or bioresourced starting materials comprise $^{14}C$. All the carbon samples drawn from living organisms (animals or plants) are in fact a mixture of 3 isotopes: $^{12}C$ (representing approximately 98.892%), $^{13}C$ (approximately 1.108%) and $^{14}C$ (traces: $1.2 \times 10^{-10}$%). The $^{14}C/^{12}C$ ratio of living tissues is identical to that of the atmosphere. In the environment, $^{14}C$ exists in two predominant forms: in the inorganic form, that is to say of carbon dioxide gas ($CO_2$), and in the organic form, that is to say of carbon incorporated in organic molecules.

In a living organism, the $^{14}C/^{12}C$ ratio is kept constant by the metabolism, as the carbon is continuously exchanged with the external environment. As the proportion of $^{14}C$ is constant in the atmosphere, it is the same in the organism, while it is living, since it absorbs this $^{14}C$ in the same way as the ambient $^{12}C$. The mean ratio of $^{14}C/^{12}C$ is equal to $1.2 \times 10^{-12}$.

$^{12}$C is stable, that is to say that the number of $^{12}$C atoms in a given sample is constant over time. $^{14}$C is for its part radioactive (each gram of carbon of a living being contains sufficient $^{14}$C isotopes to give 13.6 disintegrations per minute) and the number of such atoms in a sample decreases over time (t) according to the law:

$$n = no \exp(-\underline{a}t),$$

in which:
no is the number of $^{14}$C atoms at the start (at the death of the creature, animal or plant),
n is the number of $^{14}$C atoms remaining after time t,
$\underline{a}$ is the disintegration constant (or radioactive constant); it is related to the half life.

The half life (or half life period) is the time at the end of which any number of radioactive nuclei or unstable particles of a given: entity is reduced by half by disintegration; the half life $T_{1/2}$ is related to the disintegration constant $\underline{a}$ by the formula $\underline{a}T_{1/2} = \ln 2$. The half life of $^{14}$C is 5730 years.

In view of the half life $(T_{1/2})$ of $^{14}$C, the $^{14}$C content is substantially constant from the extraction of the renewable starting materials up to the manufacture of the polyamides according to the invention and even up to the end of their use.

The polyamides according to the invention comprise organic carbon (that is to say carbon incorporated in organic molecules) resulting from starting materials of renewable origin, which can be certified by determination of the $^{14}$C content according to one of the methods described in Standard ASTM D6866-06 (Standard Test Methods for Determining the Biobased Content of Natural Range Materials Using Radiocarbon and Isotope Ratio Mass Spectrometry Analysis).

This Standard ASTM D6866-06 comprises three methods for measuring organic carbon resulting from renewable starting materials, referred to as biobased carbon. The proportions indicated for the polyamides of the invention are preferably measured according to the method by mass spectrometry or the method by liquid scintillation spectrometry which are described in this standard.

Consequently, the presence of $^{14}$C in a material, whatever the amount thereof, gives an indication with regard to the origin of its constituent molecules, namely that a certain fraction no longer originates from fossil materials but from renewable starting materials. The measurements carried out by the methods described in Standard ASTM D6866-06 thus make it possible to distinguish the starting monomers or reactants resulting from renewable materials from the monomers or reactants resulting from fossil materials. These measurements have a test role.

Thus, on using the dicarboxylic acid Y obtained from a renewable starting material, polyamides are obtained which exhibit mechanical, chemical and thermal properties similar to those of the polyamides of the prior art obtained from diacids resulting from the petrochemical industry, this corresponding at least to one of the sustainable development concerns mentioned above, namely the fact of limiting the use of fossil resources.

The starting materials of vegetable origin exhibit the advantage of being composed of compounds having essentially even numbers of carbon atoms, in contrast to the monomers resulting from petroleum fractions, which for their part have impurities comprising both even and odd numbers of carbon atoms. Thus, the impurities brought in during the processes for the conversion of products resulting from starting materials of vegetable origin have essentially an even number of carbon atoms. The presence of these impurities comprising an odd number of carbon atoms has a direct impact on the macromolecular structure of the final polyamide, resulting in an effect of disturbance to the structure. Consequently, some properties of the polyamide may be found to be affected thereby, such as the crystallinity, the melting point or the glass transition temperature, for example.

In other words, the monomer Y of the polyamide is obtained from $C_{12}$, $C_{14}$ or $C_{16}$ diacids, themselves originating from renewable starting materials, identification of which is carried out from Standard ASTM D6866. The content, expressed as percentage, of renewable organic carbon in the polyamide according to the invention, denoted $\% \ C_{renew.org}$, is strictly greater than 0, the content $\% \ C_{renew.org}$ corresponding to the following equation (I):

$$\% \ C_{renew,org} = \frac{\sum_i Fi \times Ci + \sum_k Fk \times Ck'}{\left(\sum_j Fj \times Cj + \sum_i Fi \times Ci + \sum_k Fk \times Ck\right)} \times 100 \quad (I)$$

with
i = monomer(s) resulting from 100% renewable starting materials,
j = monomer(s) resulting from 100% fossil starting materials,
k = monomer(s) resulting in part from renewable starting materials,
Fi, Fj, Fk = respective molar fraction(s) of the monomers i, j and k in the polyamide,
Ci, Cj, Ck = respective number of carbon atoms of the monomers i, j and k in the polyamide,
Ck' = number of renewable organic carbon atoms in the monomer(s) k,
the nature (renewable or fossil), that is to say the provenance of each of the monomers i, j and k, being determined according to one of the measurement methods of Standard ASTM D6866.

The (co)monomers X and Y are monomers i, j and k within the meaning of the equation (1).

Preferably, the polyamide comprises a content $\% \ C_{renew.org}$ of greater than or equal to 20%, advantageously of greater than or equal to 40%, preferably of greater than or equal to 50% and more preferably of greater than or equal to 52%.

When the polyamide according to the invention exhibits a content $\% \ C_{renew.org}$ of greater than or equal to 50%, it meets the criteria for obtaining the "Biomass Pla" certification of the JBPA, a certification which is also based on Standard ASTM D6866. The polyamide according to the invention can in addition validly carry the "Biomass-based" label of the JORA.

For example, the (co)monomer(s) can result from renewable resources, such as vegetable oils or natural polysaccharides, such as starch or cellulose, it being possible for the starch to be extracted, for example, from maize or potato. This or these (co)monomer(s) or starting material(s) can in particular originate from various conversion processes, in particular conventional chemical processes, but also from processes for conversion by the enzymatic route or by biofermentation.

The $C_{12}$ diacid (dodecanedioic acid) can be obtained by biofermentation of dodecanoic acid, also known as lauric acid, it being possible for the lauric acid to be extracted from the rich oil made up of palm kernel and coconut, for example.

The $C_{14}$ diacid (tetradecanedioic acid) can be obtained by biofermentation of myristic acid, it being possible for the myristic acid to be extracted from the rich oil made up of palm kernel and coconut, for example.

The $C_{16}$ diacid (hexadecanedioic acid) can be obtained by biofermentation of palmitic acid, the latter occurring mainly in palm oil, for example.

For example, it is possible to use the modified yeast *Candida tropicalis* in order to bring about the conversion of a fatty monoacid to a diacid (WO 91/06660; U.S. Pat. No. 4,474,882).

The monomer X of the polyamide according to the invention represents a cycloaliphatic diamine.

Among cycloaliphatic diamines, those comprising two rings are preferred. They correspond in particular to the following general formula:

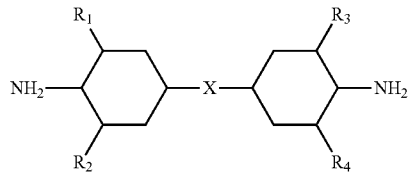

in which:
R₁ to R₄ represent identical or different groups chosen from a hydrogen atom or alkyl groups of 1 to 6 carbon atoms and X represents either a single bond or a divalent group composed:
  of a linear or branched aliphatic chain comprising from 1 to carbon atoms,
  of a cycloaliphatic group of 6 to 12 carbon atoms,
  of a linear or branched aliphatic chain of 1 to 10 carbon atoms substituted by cycloaliphatic groups of 6 to 8 carbon atoms,
  of a group of 8 to 12 carbon atoms composed of a linear or branched dialkyl with a cyclohexyl or benzyl group.

More preferably, the cycloaliphatic diamine of the copolyamide according to the invention is chosen from bis(3,5-dialkyl-4-aminocyclohexyl)methane, bis(3,5-dialkyl-4-aminocyclohexyl)ethane, bis(3,5-dialkyl-4-aminocyclohexyl)propane, bis(3,5-dialkyl-4-aminocyclohexyl)butane, bis(3-methyl-4-aminocyclohexyl)methane (BMACM or MACM), p-bis(aminocyclohexyl)methane (PACM) and isopropylidenedi(cyclohexylamine) (PACP).

More preferably still, and with a view to obtaining transparent copolyamide, the cycloaliphatic diamine is chosen from bis(3-methyl-4-aminocyclohexyl)methane (BMACM or MACM), in particular that sold by BASF under the name Laromin® C260, and p-bis(aminocyclohexyl)methane (PACM).

PACM20, comprising of the order of 20% by weight of the trans/trans stereoisomer, in particular that sold by Air Products under the name Amicure®, is more particularly preferred.

The choice of such cycloaliphatic diamines (BACM or PACM20) makes it possible to obtain, in the majority of cases, a transparent polyamide, the transparency being characterized by an enthalpy of fusion of the polyamide with a value of between 0 and 12 J/g.

Among all the possible combinations for the polyamides X·Y, the polyamides corresponding to one of the formulae chosen from MACM.12, MACM.14, PACM.12 or PACM.14 will be selected in particular.

The nomenclature used to define the polyamides is described in Standard ISO 1874-1:1992 "Plastics—Polyamide (PA) moulding and extrusion materials—Part 1: Designation", in particular on page 3 (tables 1 and 2), and is well known to a person skilled in the art.

The molar proportions of cycloaliphatic diamine and of diacid are preferably stoichiometric.

More particularly, the polyamide is a copolyamide and can comprise at least two distinct units and can correspond to the following general formulation:

X·Y/Z in which:
X and Y are as defined above,
Z is chosen from a unit obtained from an amino acid, a unit obtained from a lactam and a unit corresponding to the formula (Ca diamine)·(Cb diacid), with a representing the number of carbon atoms of the diamine and b representing the number of carbon atoms of the diacid, a and b each being between 4 and 36.

When Z represents an amino acid, it can be chosen from 9-aminononanoic acid, 10-aminodecanoic acid, 12-aminododecanoic acid and 11-aminoundecanoic acid, and its derivatives, in particular N-heptyl-11-aminoundecanoic acid.

In place of one amino acid, it might also be possible to envisage a mixture of two, three or more amino acids. However, the copolyamides formed would then comprise three, four or more units respectively.

Among the combinations which can be envisaged; the following copolyamides are of particularly great interest: they are copolyamides corresponding to one of the formulae chosen from B.12/11, B.12/12, P.12/11, P.12/12, B.14/11, P.14/11, B.14/12 or P.14/12, the number 11 symbolizing the monomer resulting from 11-aminoundecanoic acid, the number 12 after the / symbolizing the unit resulting from laurolactam, P symbolizing the diamine PACM, B symbolizing the diamine MACM, the number 12 following the monomer B or P symbolizing dodecanedioic ($C_{12}$) acid, and the number 14 following the monomer B or P symbolizing tetradecanedioic ($C_{14}$) acid.

In an advantageous version of the invention, the molar content of Z is between 2 and 80%, the molar content of cycloaliphatic diamine X being between 10 and 49% and the molar content of diacid Y also being between 10 and 49%.

It is specified that the expression "between", used in the preceding paragraphs but also in the continuation of the present description, should be understood as including each of the limits mentioned.

The choice of such molar contents makes it possible to obtain, in the majority of cases, a transparent copolyamide, the transparency being characterized by an enthalpy of fusion of the copolyamide with a value of between 0 and 12 J/g.

When Z represents a lactam, it can be chosen from pyrrolidinone, piperidinone, caprolactam, enantholactam, caprylolactam, pelargolactam, decanolactam, undecanolactam and laurolactam.

When the unit Z is a unit corresponding to the formula (Ca diamine)·(Cb diacid), the (Ca diamine) unit is of formula $H_2N—(CH_2)_a—NH_2$, when the diamine is aliphatic and linear.

Preferably, the Ca diamine is chosen from butanediamine (a=4), pentanediamine (a=5), hexanediamine (a=6), heptanediamine (a=7), octanediamine (a=8), nonanediamine (a=9), decanediamine (a=10), undecanediamine (a=11), dodecanediamine (a=12), tridecanediamine (a=13), tetradecanediamine (a=14), hexadecanediamine (a=16), octadecanediamine (a=18), octadecenediamine (a=18), eicosanediamine (a=20), docosanediamine (a=22) and the diamines obtained from fatty acids.

When the diamine is cycloaliphatic, it is chosen from bis(3,5-dialkyl-4-aminocyclohexyl)methane, bis(3,5-dialkyl-4-aminocyclohexyl)ethane, bis(3,5-dialkyl-4-aminocyclohexyl)propane, bis(3,5-dialkyl-4-aminocyclohexyl)butane, bis(3-methyl-4-aminocyclohexyl)methane (BMACM or MACM), p-bis(aminocyclohexyl)methane (PACM) and isopropylidenedi(cyclohexylamine) (PACP). It can also comprise the following carbon-based backbones: norbornylmethane, cyclohexylmethane, dicyclohexylpropane, di(methylcyclohexyl) or di(methylcyclohexyl)propane. A nonexhaustive list of these cycloaliphatic diamines is given in the publication "Cycloaliphatic Amines" (Encyclopaedia of Chemical Technology, Kirk-Othmer, 4th Edition (1992), pp. 386-405).

When the diamine is an arylaromatic diamine, it is chosen from 1,3-xylylenediamine and 1,4-xylylenediamine and their mixture.

When the (Cb diacid) monomer is aliphatic and linear, it is chosen from succinic acid (y=4), pentanedioic acid (y=5), adipic acid (y=6), heptanedioic acid (y=7), octanedioic acid (y=8), azelaic acid (y=9), sebacic acid (y=10), undecanedioic acid (y=11), dodecanedioic acid (y=12), brassylic acid (y=13), tetradecanedioic acid (y=14), hexadecanedioic acid (y=16), octadecanedioic acid (y=18), octadecenedioic acid (y=18), eicosanedioic acid (y=20), docosanedioic acid (y=22) and the dimer fatty acids comprising 36 carbons.

The dimer fatty acids mentioned above are dimerized fatty acids obtained by oligomerization or polymerization of unsaturated monobasic fatty acids comprising a long hydrocarbon chain (such as linoleic acid and oleic acid), as described in particular in the document EP 0 471 566.

When the diacid is a cycloaliphatic diacid, it can comprise the following carbon-based backbones: norbornylmethane, cyclohexylmethane, dicyclohexylmethane, dicyclohexylpropane, di(methylcyclohexyl) or di(methylcyclohexyl)propane.

When the diacid is an aromatic diacid, it is chosen from terephthalic acid, isophthalic acid and naphthalenedicarboxylic acid.

When the specific case arises where the comonomers or units X·Y and when Z is a (Ca diamine)·(Cb diacid) unit are strictly identical (that is to say, a=MACM or PACM and Cb=C12, C14 or C16); a homopolyamide as mentioned above is concerned which can comprise diacids both of renewable origin and of fossil origin.

Among all the possible combinations for the copolyamides X·Y/Z in which L is a (Ca diamine)·(Cb diacid) unit, the copolyamides corresponding to one of the formulae chosen from B.12/10.12, P.12/10.12, B.14/10.14, P.14/10.14, B.12/10.10, P.12/10.10, B.14/10.10 or P.14/10.10 will be selected in particular.

According to another aspect of the invention, the copolyamide additionally comprises at least one third comonomer and corresponds to the following general formulation:

X·Y/Z/A in which

A is chosen from a unit obtained from an amino acid, a unit obtained from a lactam and a unit corresponding to the formula (Cd diamine)·(Ce diacid), with d representing the number of carbon atoms of the diamine and e representing the number of carbon atoms of the diacid, a and b each being between 4 and 36.

In the formula X·Y/Z/A, reference will be made to that which was described above for the (co)monomers or units KY, on the one hand, and Z, on the other hand.

In this same formula, the A unit has the same meaning as the Z unit defined above.

Among all the possible combinations for the copolyamides X·Y/Z/A according to the last alternative form, the copolyamides corresponding to one of the formulae chosen from B.12/11/P.12, B.12/12/P.12, B.14/11/P.14, 13.14/12/P.14, B.12/11/6.10, B.12/12/6.10, P.12/11/6.10, P.12/12/6.10, B.12/11/10.10, B.12/12/10.10, P.12/11/10.10, P.12/12/10.12, B.12/11/10.12, B.12/12/10.12, P.12/11/10.12, P.12/12/10.12, B.14/11/6.10, B.14/12/6.10, P.14/11/6.10, P.14/12/6.10, B.14/11/10.10, B.14/12/10.10, P.14/11/10.10, P.14/12/10.12, B.14/11/10.12, B.14/12/10.12, P.14/11/10.12 or P.14/12/10.12 will be selected in particular.

The Z and A units can originate from fossil resources or from renewable resources, thus increasing the proportion of organic carbon in the final polyamide.

The invention also relates to a process for the preparation of a polyamide as defined above comprising at least one stage of polycondensation of at least one diacid, comprising carbon of renewable origin or bioresourced carbon, with a cycloaliphatic diamine.

The above preparation process can be supplemented by two stages preceding the abovementioned polycondensation stage:

a) obtaining a fatty monoacid from a renewable starting material, such as, for example, vegetable or animal oils; optionally purifying, b) preparing a diacid from the fatty monoacid resulting from the preceding stage, such as, for example, by fermentation;

the said diacid subsequently being polycondensed with a cycloaliphatic diamine.

The invention also relates to a composition comprising at least one polyamide.

A composition in accordance with the invention can additionally comprise at least one second polymer.

Advantageously, this second polymer can be chosen from a semicrystalline polyamide, an amorphous polyamide, a semicrystalline copolyamide, an amorphous copolyamide, a polyetheramide, a polyesteramide and their blends.

Preferably, this second polymer is obtained from a renewable starting material, that is to say corresponding to the test of Standard ASTM D6866.

This second polymer can in particular be chosen from starch, which can be modified and/or formulated, cellulose or its derivatives, such as cellulose acetate or cellulose ethers, polylactic acid, polyglycolic acid and polyhydroxyalkanoates.

The composition according to the invention can also additionally comprise at least one additive.

This additive can be chosen in particular from fillers, fibres, dyes, stabilizers, in particular UV stabilizers, plasticizers, impact modifiers, surface-active agents, pigments, brighteners, antioxidants, natural waxes and their mixtures.

Mention may in particular be made, among the fillers, of silica, carbon black, carbon nanotubes, expanded graphite, titanium oxide or glass beads.

Preferably, this additive will be of natural and renewable origin, that is to say corresponding to the test of Standard ASTM D6866.

While, with the exception of N-heptyl-11-aminoundecanoic acid, the dimer fatty acids and the cycloaliphatic diamines, the comonomers or starting materials envisaged in the present description (amino acids, diamines, diacids) are effectively linear, nothing forbids it from being envisaged for them to be able, in all or part, to be branched, such as 2-methyl-1,5-diaminopentane, or partially unsaturated.

It should be noted in particular that the $C_{18}$ dicarboxylic acid can be octadecanedioic acid, which is saturated, or else octadecanedioic acid, which for its part exhibits an unsaturation.

The copolyamide according to the invention or also the composition according to the invention can be used to constitute a structure.

This structure can be monolayer, when it is formed only from the copolyamide or only from the composition according to the invention.

This structure can also be a multilayer structure, when it comprises at least two layers and when one at least of the different layers forming the structure is formed from the polyamide or from the composition according to the invention.

The structure, whether monolayer or multilayer, can be provided in particular in the form of fibres, of a film, of a pipe, of a hollow body, of an injected component or of a lens.

The polyamide according to the invention or also the composition according to the invention can advantageously be used in the manufacture of lenses, in particular optical lenses, of spectacle lenses or of spectacle frames.

The use of the polyamide or of the composition according to the invention can also be envisaged for all or part of components of electrical and electronic goods, such as telephones, computers or multimedia systems.

The polyamides and compositions of the invention can be manufactured according to the usual processes described in the prior art. Reference will in particular be made to the document DE 4318047 or U.S. Pat. No. 6,143,862.

The present invention will now be described in the following examples, such examples being given with a solely illustrative aim and very clearly without implied limitation.

EXAMPLES

1/ Preparation of Various Polyamides (Trials A to H)

The monomers used in trials A to Hare as follows:
11-aminoundecanoic acid (denoted A11 in Table 1), supplied by Arkema, CAS 2432-99-7,
bis(3-methyl-4-aminocyclohexyl)methane (denoted MACM in Table 1), sold under the name Laromin® C260 by BASF, CAS 6864-37-5,
p-bis(aminocyclohexyl)methane (denoted PACM20 in Table comprising 21% by weight of trans/trans isomer, sold under the name Amicure® by Air Products, CAS 1761-71-3,
dodecanedioic acid (denoted DC12 in Table 1), obtained from lauric acid,
tetradecanedioic acid (denoted DC14 in Table 1), obtained from myristic acid,
lactam 12 (denoted L12 in Table 1), sold by Arkema, CAS 947-04-6.

Various homopolyamides and copolyamides were prepared from 2 or 3 monomers, as a mixture with several additives, according to the specific compositions (Examples A to H) given in Table 1.

The preparation process, which can be adapted for all of Examples A to H, will now be described in detail for Example A.

It is specified that the amounts contents by weight of additives indicated below are applicable for all of Examples A to H.

The composition of Example A comprises the following monomers and additives (benzoic acid, hypophosphorous acid, Irganox® 1098, which is an antioxidant sold by CIBA, demineralized water), in the following contents by weight:

13.98 kg of dodecanedioic acid (60.82 mol)
14.58 kg of MACM (61.16 mol)
72.17 g of benzoic acid (0.59 mol)
35 g of Irganox® 1098
8.75 g of hypophosphorous acid ($H_3PO_2$)
525 g of distilled water This composition is introduced into a 92 l autoclave reactor which, once closed, is heated with stirring to 260° C. After a phase of maintaining under autogenous pressure for 2 hours, the pressure is then reduced to atmospheric pressure over 1.5 h. The reactor is then degassed for approximately 1 h at 280° C. by flushing with nitrogen.

The homopolyamide obtained is then extruded in the form of laces, cooled in a water bath at ambient temperature and then granulated.

The granules obtained are subsequently dried at 80° C. for 12 h under vacuum, in order to achieve a moisture content of less than 0.1%.

The homopolyamides and copolyamides of Examples A to H are in accordance with the invention, in the sense that the content % $C_{renew.org}$ is indeed strictly greater than 0.

In addition, the copolyamides of Examples A to H are additionally transparent.

Furthermore, copolyamides comprising 2 or three distinct units have been explicitly described. However, nothing forbids the envisaging of copolyamides comprising more than three distinct units, for example four or five distinct units, each of these multiple units being obtained either from an amino acid or from a lactam or corresponding to the formula (diamine)·(diacid), with the proviso that the polyamide comprises organic carbon of renewable origin determined according to Standard ASTM D6866, in other words the content % $C_{renew.org}$, determined by the equation (I) set out above, is strictly greater than 0.

TABLE 1

| Examples | MACM mol % | PACM mol % | DC 12 mol % | DC 14 mol % | A 11 mol % | L 12 mol % | %(w) Renewable C (ASTM D6866) |
|---|---|---|---|---|---|---|---|
| A | 50 | 0 | 50 | 0 | 0 | 0 | 44.4 |
| B | 0 | 50 | 50 | 0 | 0 | 0 | 48.0 |
| C | 50 | 0 | 0 | 50 | 0 | 0 | 48.3 |
| D | 0 | 50 | 0 | 50 | 0 | 0 | 51.9 |
| E | 30 | 0 | 30 | 0 | 0 | 40 | 27.9 |

TABLE 1-continued

| Examples | MACM mol % | PACM mol % | DC 12 mol % | DC 14 mol % | A 11 mol % | L 12 mol % | %(w) Renewable C (ASTM D6866) |
|---|---|---|---|---|---|---|---|
| F | 0 | 30 | 30 | 0 | 0 | 40 | 29.3 |
| G | 30 | 0 | 30 | 0 | 40 | 0 | 64.0 |
| H | 0 | 30 | 30 | 0 | 40 | 0 | 67.2 |

2/ Comparison of the Proportions of Impurities Present in Samples of Diacids of Fossil and Vegetable Origin Samples of the following diacids were analysed:
a dodecanedioic acid prepared according to the following process:

Laurie acid can be extracted from coconut oil or else from palm kernel oil. A dodecanedioic acid can subsequently be obtained by biofermentation, using the appropriate microorganism, starting from lauric acid. The diacid can subsequently be subjected to an amination in the presence of ammonia and of at least one strong base, without solvent.
 a dodecanedioic acid of fossil origin,
 a tetradecanedioic acid prepared according to the following process:

Myristic acid can be extracted from coconut oil or else from palm kernel oil. A tetradecanedioic acid can subsequently be obtained by biofermentation, using the appropriate microorganism, starting from myristic acid. The diacid can subsequently be subjected to an amination in the presence of ammonia and of at least one strong base, without solvent.
 a tetradecanedioic acid of fossil origin.

All these products were derived beforehand by silylation in a mixture of acetonitrile, trimethylamine and bis(trimethylsilyl)trifluoroacetamide.

Samples of each of the products obtained are analysed semiquantitatively by coupled gas chromatography/mass spectrometry. The internal standard used is Tinuvin 770, and the column is of the CP-SIL 5CB type (Varian) with a length of 50 m.

This analysis makes it possible to identify a certain number of impurities of aliphatic diacid type, some comprising an even number of carbon atoms and others an odd number of carbon atoms, and to semiquantitatively compare their mutual contents.

Thus, for each of the samples analysed, the following ratio R was calculated:

$$R = \frac{\text{amount of impurity comprising an odd number of carbon atoms}}{\text{amount of impurity comprising an even number of carbon atoms}}$$

The results appear in the table below:

TABLE 2

| | Origin | R |
|---|---|---|
| Dodecanedioic acid | fossil | 0.650 |
| | vegetable | 0.115 |
| Tetradecanedioic acid | fossil | 0.175 |
| | vegetable | 0.098 |

These analyses show that the proportion of impurities comprising an odd number of carbon atoms is much lower in the case of products of vegetable origin, which contributes to inflicting less disturbance on the macromolecular structure of the polyamides prepared from these products.

3/ Evaluation of the Atmospheric $CO_2$ Exited from the Carbon Cycle

The amounts of atmospheric $CO_2$ "exited" from the carbon cycle when one tonne of the polyamides of the invention is produced are given in the table below.

TABLE 3

| | B.12 | B.14 | B.16 |
|---|---|---|---|
| Atmospheric $CO_2$ equivalent stored/tonne of PA | 1.22 tonnes | 1.34 tonnes | 1.44 tonnes |

4/ Evaluation of the Weight of $CO_2$ Potentially Released at the End of Life

The measurement is carried out on. B.12 having a molecular formula for the repeat unit of $C_{27}H_{48}N_2O_2$, the molar mass of the repeat unit being 432 g/mol with a weight of carbon C of 324 g/mol, i.e. a total % C=75%.

TABLE 4

| | B.12 100% resulting from fossil resources | B.12 Partially bioresourced |
|---|---|---|
| % Renewable C/all of the C constituting the PA | 0 | 44 |
| Weight of non-neutral $CO_2$ (t) originating from the backbone per tonne of PA potentially released at the end of life (incineration) | 2.75 | 1.53 |
| % of reduction in fossil $CO_2$ released during incineration | 0 | 44 |

The invention claimed is:

1. A process for the preparation of a polyamide having at least one repeat unit corresponding to the formula:

X-Y in which:
X represents a cycloaliphatic diamine and
Y represents an aliphatic dicarboxylic acid that is dodecanedioic ($C_{12}$) acid,
said dicarboxylic acid comprising organic carbon of renewable origin, determined according to Standard ASTM D6866, said process comprising at least one polycondensation of at least one fatty diacid, said diacid comprising carbon of renewable origin determined according to Standard ASTM D6866, with a cycloaliphatic diamine, said process comprising:
a) obtaining a fatty monoacid from vegetable oil, the fatty monoacid being lauric acid extracted from rich oil made up of palm kernel or coconut oil, as renewable starting material, containing mainly impurities with an even number of carbon atoms, and optionally purifying,
b) preparing a diacid Y from the fatty monoacid resulting from a),
c) polycondensing the said diacid Y with the cycloaliphatic diamine X.

2. The process according to claim 1, wherein the polyamide produced has a content, expressed as percentage, of organic carbon of renewable origin, denoted % $C_{renew.org}$, of greater than or equal to 20%.

3. The process according to claim 1, wherein the polyamide produced is a homopolyamide.

4. The process according to claim 1, wherein monomer X is 3,3'-dimethyl-4,4'-diaminodicyclohexylmethane (BMACM or MACM) or p-bis(aminocyclohexyl)methane (PACM).

5. The process according to claim 1, wherein the polyamide produced has formula MACM.12, or PACM.12, with 12 meaning dodecanedioic ($C_{12}$) acid.

6. The process according to claim 1, wherein the polyamide produced is a copolyamide comprising at least two distinct units of the formula:

X·Y/Z in which:
Z is a unit obtained from an amino acid, a unit obtained from a lactam or a unit of the formula (Ca diamine)·(Cb diacid), with a representing the number of carbon atoms of the diamine and b representing the number of carbon atoms of the diacid, a and b each being between 4 and 36.

7. The process according to claim 6, wherein the copolyamide has the formula: B.12/11, B.12/12, P.12/11, P.12/12, B.12/10.12, P.12/10.12, B.12/10.10, or P.12/10.10, B denoting 3,3'-dimethyl-4,4'-diaminodicyclohexylmethane and P denoting p-bis(aminocyclohexyl) methane, 10 meaning decanoic acid ($C_{10}$), 11 meaning undecanoic acid ($C_{11}$), and 12 meaning dodecanedioic ($C_{12}$) acid.

8. The process according to claim 2, wherein the polyamide produced has a content, expressed as a percentage, of organic carbon of renewable origin, denoted % $C_{renew.org}$, of greater than or equal to 40%.

9. The process according to claim 8, wherein the polyamide produced comprises a content, expressed as a percentage, of organic carbon of renewable origin, denoted % $C_{renew.org}$, of greater than or equal to 50%.

10. The process according to claim 9, wherein the polyamide produced has a content, expressed as a percentage, of organic carbon of renewable origin, denoted % $C_{renew.org}$, of greater than or equal to 52%.

* * * * *